April 25, 1950  E. M. S. McWHIRTER ET AL  2,504,999
ELECTRIC SIGNALING SYSTEM
Filed April 25, 1947  4 Sheets-Sheet 3

Inventor.
Eric Malcolm Curtis McWhirter
Roland Harris Dunn
Peter William Lennox
By
E. R. Phinney
Attorney

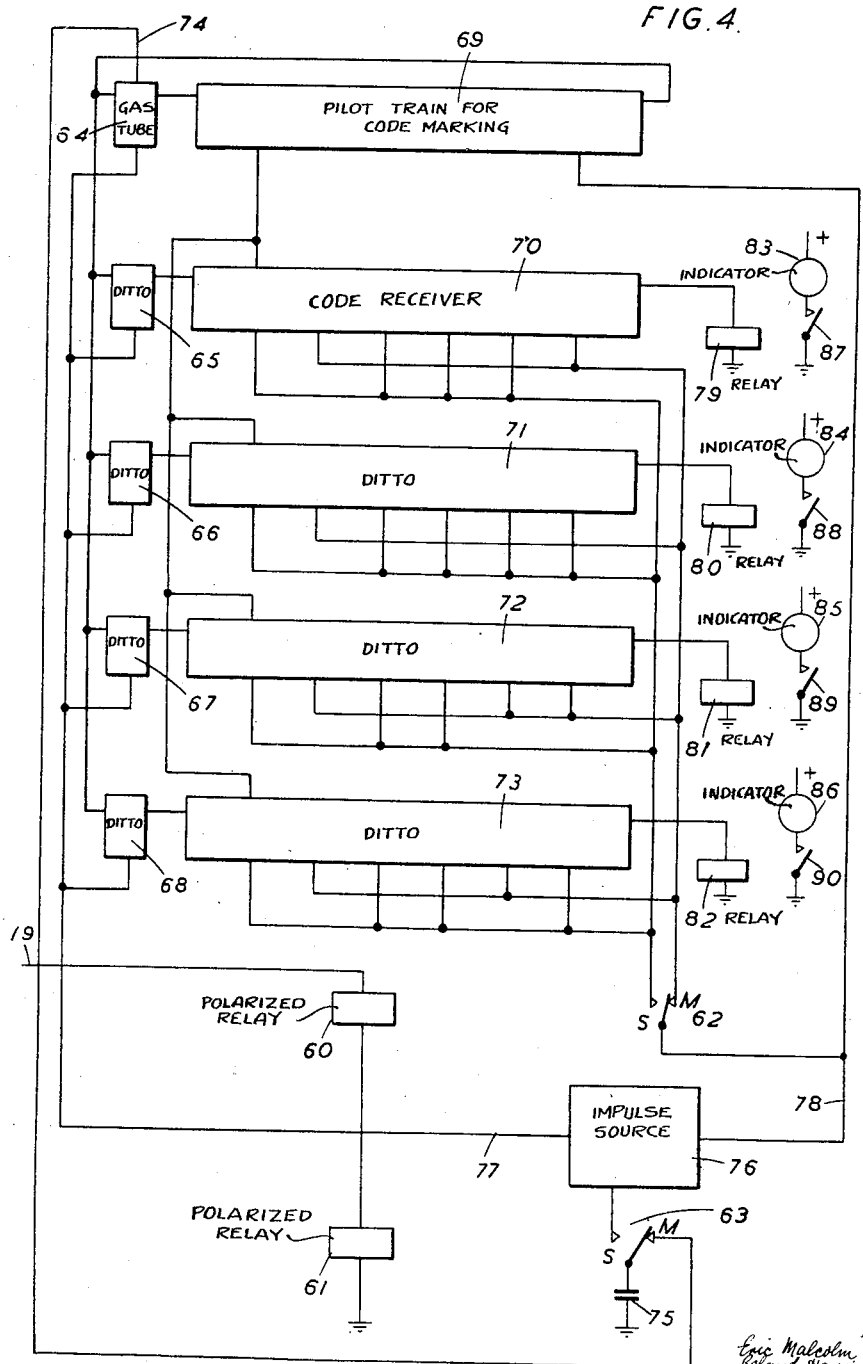

UNITED STATES PATENT OFFICE 2,504,999

ELECTRIC SIGNALING SYSTEM

Eric Malcolm Swift McWhirter, Roland Harris Dunn, and Peter William Lennox, London, England, assignors to International Standard Electric Corporation, New York, N. Y.

Application April 25, 1947, Serial No. 744,009
In Great Britain February 19, 1946

12 Claims. (Cl. 177—351)

This invention relates to electric signalling systems. There are many arrangements in which it is required to exercise at a control station continuous supervision of the readings of meters at a sub-station. It is generally impracticable to allot a separate channel of transmission for each meter and it is one object of the present invention to provide an electric signalling system by means of which signals representative of the readings of a plurality of meters may be sent over a signalling channel in such a way as to be readily separable at a supervisory station for actuation of devices individual to each meter.

In one of its aspects the invention is an electric signalling system comprising a plurality of meters, contacts individual to each meter, means for actuating the respective contacts each time a unit of the quantity being metered has been accumulated, means operative upon actuation of any contact to transmit over a signalling channel a code signal characteristic of the particular contact, and means at the receiving end of said channel and operative upon the receipt of said characteristic code signal for actuating a device individual to said contacts.

The invention may be applied to the remote indication of the readings of a plurality of kilowatt-hour meters situated at one or more electric power substations, each meter closing contacts individual to the meter each time the rotating parts complete one revolution, and operating corresponding meters at a main or supervisory station over a common signalling channel. Other examples of meters which close contacts each time a unit of the quantity being metered has been accumulated are described in two co-pending applications of E. M. S. McWhirter and R. H. Dunn, both filed January 2, 1947, and bearing respective Serial Nos. 719,771 and 719,772; and in a third co-pending application of E. M. S. Mc-Whirter-R. H. Dunn filed January 7, 1947, bearing Serial No. 720,539, now abandoned.

It is preferred to use as the characteristic code signals, code combinations of "marking" and "spacing" elements as is well known in the teleprinter art. The number of elements in the code combination need be only sufficient to provide a separate code combination for each contact but in the interests of general flexibility of the system it is preferred to use a start-stop teleprinter code, the elements of which are sent successively.

In order to ensure successive transmission of code combinations individual to meters the contacts of which are operated simultaneously, or within such an interval of time that the transmission of one code signal has not been completed before the contact of another meter has been actuated, means is provided for causing the sequential operation of the corresponding codes.

This means may take the form of a distributor having a position corresponding to each of the contacts and this form of the invention is applicable to other systems than those for the remote supervision of meter readings.

According to another feature of the invention, therefore, there is provided an electric signalling system comprising a plurality of contacts, a continuously operable distributor having a position corresponding to each of said contacts, means operable upon said distributor reaching a position corresponding to contacts that have been actuated to stop the operation of said distributor, to cause the transmission of a signalling code individual to said contacts, and means operable upon the conclusion of said transmission to cause the resumption of the operation of said distributor.

According to yet another feature of the invention there is provided an electric signalling system comprising a plurality of contacts, a plurality of gas-filled electric discharge devices connected in a closed chain, one corresponding to each of said contacts, means for rendering the said devices conducting sequentially, means operable upon actuation of one of said contacts for registering temporarily said actuation, means operable when said actuation has been registered and when the corresponding device has become conducting to prevent the next device in the chain from becoming conducting and to cause the transmission of a signalling code individual to said contacts and means operable upon the conclusion of said transmission to cause the next device in said chain to become conducting and to effect the resumption of the action of said means for rendering the said devices conducting sequentially.

The arrangements at the receiving end of said signalling channel for actuating a device individual to the contacts that have been actuated at the transmitter are preferably those described in our co-pending application bearing Serial No. 744,010, filed April 25, 1947, now Patent No. 2,498,695, issued February 28, 1950.

A preferred embodiment of the invention will now be described with reference to the accompanying drawings in which:

Fig. 4 shows diagrammatically the arrangements at the supervisory station for operating indicators in accordance with particular received telegraph codes.

Figure 1:
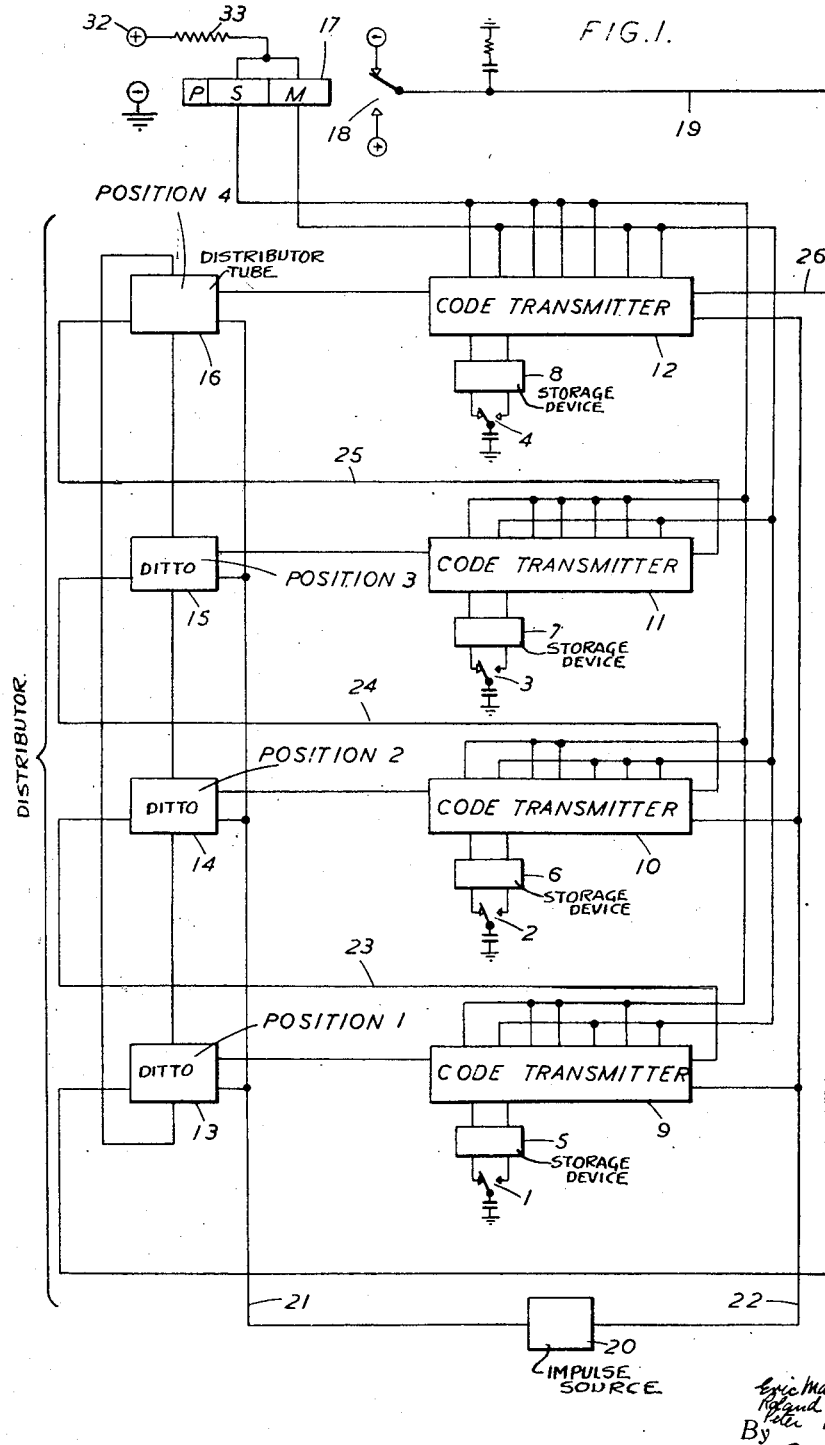
Fig. 1 is a block schematic diagram of the arrangements at a sub-station.

Referring to the drawings, Fig. 1 shows the manner in which the component parts of a transmitting arrangement according to the invention are arranged. Meter contacts 1, 2, 3 and 4 are shown in the form of changeover contacts. These contacts are normally in the position shown, but when any meter has accumulated a quantity which is to be indicated to a supervisor the contacts change over to the alternative position.

Associated with the meter contacts are corresponding storage devices 5 . . . 8, which temporarily store an indication that the contacts have changed over to the alternative position. The storage devices are associated with corresponding code transmitters 9 . . . 12. Four meter contacts only with their corresponding storage devices and code transmitters have been shown since the operation of the arrangement will be clear therefrom but any number may be provided within limits determined by the maximum rate of actuation of the meter contacts.

There is also provided a distributor having a position corresponding to each code transmitter. This distributor consists of a closed chain of three-electrode gas filled tubes each tube corresponding to a position. The tubes corresponding to the code transmitters 9 . . . 12 are shown at 13 . . . 16 respectively.

Each of the code transmitters 9 . . . 12 also consists of an unclosed chain of three-electrode gas filled tubes. Each code combination to be transmitted is a start-stop teleprinter code combination consisting of a start element, five code elements and a stop element. In each transmitter there are seven tubes one for each element of the code and the anodes of the several tubes are connected to positive potential over either the marking or the spacing winding of a polarised telegraph relay 17, the contacts 18 of which connect either marking or spacing potential accordingly to a line 19. Since only one code is transmitted at a time, the relay 17 is common to all the transmitters.

The connections of the anodes of the tubes in any particular transmitter to the marking and spacing windings of relay 17 are pre-set in accordance with a particular code combination, which has been allotted to the contacts associated with the transmitter. The anode of the first tube is, however, always connected to the spacing winding and the anode of the last tube to the marking winding corresponding to the start and stop elements respectively of the teleprinter code combination. The anodes of the tubes in code transmitter 9 corresponding to contacts 1 are shown connected to the windings of relay 17 in the order space:—(corresponding to the start element) mark, space, space mark, space and mark (corresponding to the stop element). The anodes of the tubes in transmitter 10 are connected to the windings of relay 17 in the order: space (corresponding to the start element) mark, space, space, mark, mark, mark, (corresponding to the stop element). The anodes of the tubes in transmitter 11 are connected to the windings of relay 17 in the order: space (corresponding to the start element) mark, space, space, space, space, and mark (corresponding to the stop element) whilst transmitter 12 is set to send:—space, mark, space, space, space, mark, mark.

The tubes 13 . . . 16 of the distributor are caused to be operated sequentially in that order from an impulse source 20, which is connected over a conductor 21 to all the tubes of the distributor. The impulse source 20 is also connected over a conductor 22 to all the tubes of all the code transmitters. Impulses are supplied to leads 21 and 22 in out of phase relation.

The operation of the circuit of Fig. 1 is in outline as follows. The tubes 13 . . . 16 of the distributor normally become conducting in sequence and form a closed chain. The connection of one tube to the next is such that when one tube becomes conducting a positive bias is applied to the next tube. This positive bias is insufficient to cause this next tube to become conducting until an impulse is applied over conductor 21. This impulse is applied to all the tubes in the distributor chain and is insufficient by itself to cause any tube to become conducting. The two sources of positive bias added together, however, cause the next tube to become conducting. When one tube becomes conducting the preceding tube becomes non-conducting. This operation continues so long as none of the contacts 1 . . . 4 has changed over.

Figure 2:
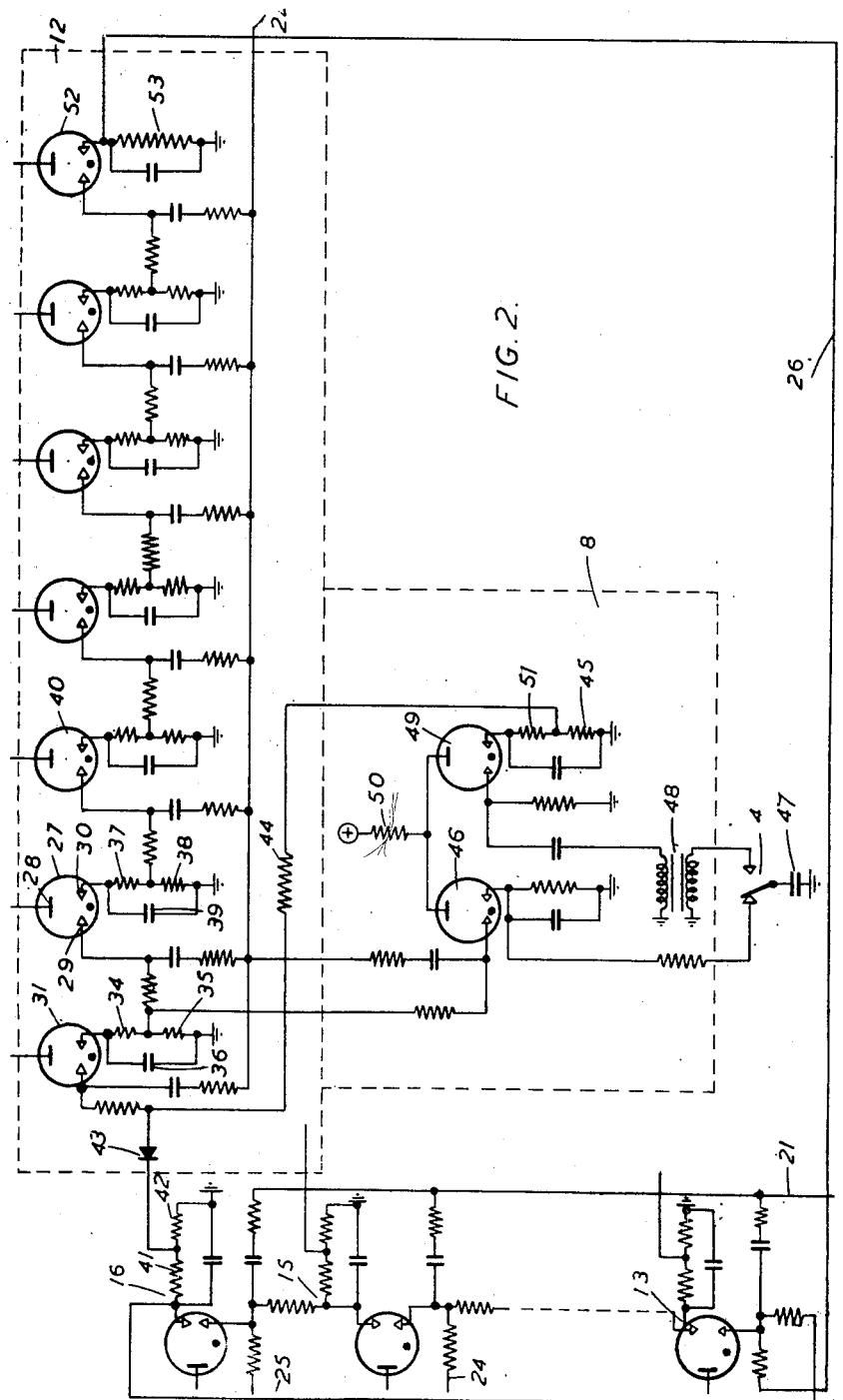
Fig. 2 is a detailed circuit diagram of enough of the arrangements of Fig. 1 to enable the operations to be followed in detail.

Each tube 13 . . . 16 in the distributor chain also tends, when conducting, to apply a bias to the start tube of the corresponding code transmitter. The nature of the connecting arrangements between these last mentioned tubes is such that this bias is normally ineffective upon the start tube even when a pulse is applied over conductor 22 to the control electrode of the start tube. When, however, one of the contacts 1 . . . 4 has changed over and this condition has been stored in the corresponding storage device 5, 6, 7 or 8, the input connections to the start tube of the corresponding transmitter are modified and the bias applied by a distributor tube becomes effective upon the start tube. This bias is, however, even then ineffective until the effect of an impulse from the conductor 22 is added thereto. The tubes 31, 27, 40 . . . 52 of the code transmitter 12 shown in Fig. 2, are connected together in an unclosed chain, the cathode of tube 52 being connected to the control electrode 13 over conductor 26. The term "unclosed chain" is used in contradistinction to the closed chain which connects tubes 13 . . . 16 wherein the cathode of tube 16 is connected to the control electrode of tube 13.

The impulses applied to conductor 21 occur at 20 millisecond intervals and the impulses applied to conductor 22 occur also at 20 millisecond intervals but each impulse on conductor 22 occurs midway between two impulses on conductor 21. Thus if a changeover of a contact has been stored, and the corresponding tube 13 . . . 16 of the distributor becomes conducting, the start tube of the corresponding code transmitter 9 . . . 12 becomes conducting at an interval of 10 milliseconds thereafter. The anode circuits of all tubes in the distributor and in the code transmitters are so interconnected that upon one tube becoming conducting, any tube that is previously conducting is rendered non-conducting and consequently the distributor tube becomes non-conducting. The effect of the start tube becoming conducting is also to wipe out the storage of the contact changeover. The tubes of the code transmitter then become conducting in turn and operate the transmitting relay 17 in the appropriate manner to send the specified code combination by means of its contacts 18 over line 19.

The last or stop tube of each code transmitter is connected over a conductor 23, 24, 25 or 26 to the distributor tube 14, 15, 16 or 13 next in the chain in a manner similar to that in which adjacent tubes in either the code transmitter or the distributor are interconnected, so that when the stop tube becomes conducting it applies a bias to the distributor tube which bias is sufficient, together with that derived from an impulse over conductor 21 to cause the last mentioned tube to become conducting. The stop tube in the code transmitter becomes non-conducting and the operation of the distributor is resumed.

It is to be understood that although contacts 18 of relay 17 have been shown connected to a line 19 for transmission of direct current, double current signal elements or any other well known means of transmitting teleprinter signals over a signalling channel of any type may be used.

The operation of the circuits at the transmitter will now be described in detail.

Fig. 2 shows the code transmitter 12, the corresponding storage device 8 and contacts 4 and three tubes 16, 15 and 13 of the distributor of Fig. 1.

All the tubes shown are of the same kind and each tube is a three-electrode, gas-filled tube, having a cold cathode, a control electrode and an anode. The control electrode and the cathode are shown similarly, the cathode being the right hand electrode of the pair in the case of all tubes in the code transmitter 12 and the storage device 8 and the upper electrode of the pair in the case of the tubes in the distributor.

Each tube is connected to the following tube in the chain in the same manner. The connections are similar to those shown in U. S. Patent No. 2,421,005, issued May 27, 1947, to F. H. Bray and L. R. Brown, but modified in order to improve the sequential operation of a series of tubes. The general manner of operation of a chain of tubes connected in this way is well-known but as this manner of operation is fundamental to the embodiment of the invention being described, a brief explanation will be given here.

All the tubes are similar so that one only need be referred to in detail. Tube 27 comprises an anode 28, a control electrode 29 and a cold cathode 30. In order to render the tube conducting the gap between the control electrode 29 and cathode 30 must be ionised and a positive potential must be applied to the anode 28 with respect to the cathodes. So long as this potential is 130 volts or more, the minimum ionisation current produced by a voltage of about 70 volts between control electrode 29 and cathode 30 is sufficient to cause current to flow between anode 28 and cathode 30. As the potential applied between anode and cathode diminishes below 130 volts, the ionisation current between control electrode and cathode, and consequently the potential applied between them that is needed to render the tube conducting, increases rapidly.

Assume that the preceding tube 31 is conducting, then current passes from the common positive source 32, Fig. 1, of about 160 volts, over a resistance 33, spacing winding of relay 17, tube 31, Fig. 2, resistances 34 and 35 to ground, which is the negative pole of the common voltage source. Resistances 34 and 35 are made of such value that the cathode of tube 31 is at least 70 volts above ground potential, and as there is across the tube 31 when conducting a voltage drop of about 70 volts, the resistance of the winding of relay 17 being low, the point common to the anode 28 of the tube 27 is at least 130 volts positive with respect to its cathode. The voltage drop across resistors 34—35 totals 70 volts and the voltage drop across tube 31 totals an additional 70 volts. Therefore anode 28 which is connected in common with the anode of tube 31 has a potential of 140 volts less the additional voltage drop caused by the winding of relay 17 and resistance 33 which brings this voltage down to 130 volts. Since tube 27 is not yet conducting resistances 37 and 38 represent no impedance and therefore full ground potential appears on cathode 30 and the difference between the anode 28 and the cathode 30 is 130 volts.

Resistances 34 and 35 are equal and thus a potential of about 35 volts is impressed between control electrode 29 and cathode 30 of tube 28. This potential of 35 volts is insufficient to ionise the gap between these two electrodes. It is to be noted that resistances 34 and 35 are shunted by a condenser 36 which delays the rise in voltage across the resistance 34 and 35 upon tube 31 becoming conducting until the condenser 36 is fully charged.

Impulses are applied between conductor 22 and ground at intervals of 20 milliseconds and are of such polarity as to impress a potential of about 35 volts between the control electrode 29 of tube 27 and its cathode 30. This potential added to the potential across resistance 35 is sufficient to ionise the gap between control electrode 29 and cathode 30 of tube 27. As the anode 28 of tube 27 is at a potential of at least 130 volts with respect to the cathode 30, tube 27 becomes conducting. The control electrodes of all the tubes in the code transmitter 12 are similarly connected to impulse conductor 22 but the voltage impressed on the control electrodes of tubes other than tube 27 by an impulse is insufficient by itself to ionise the gap between control electrode and cathode. This happens only with tube 27 because in the case of that tube the voltage due to the impulse on conductor 22 is added to the voltage already impressed between control electrode and cathode from the circuit of the preceding tube 31.

When tube 27 becomes conducting the voltage drop across the tube is about 70 volts and as the potential rise across resistances 37 and 38 is momentarily delayed by condenser 39 the anode potential of tube 27 and therefore the anode potential of tube 31 momentarily drops to this value, and tube 31 therefore becomes non-conducting and the ionisation therein disappears after an interval of 3 milliseconds. The potential across resistances 37 and 38 in the anode-cathode circuit of tube 27 does not attain its full value during the period of the impulse that made tube 27 conducting. The following tube 40 is not therefore able to become conducting immediately but must wait for the next impulse applied to conductor 22.

The detailed operation of the circuit of Fig. 1 can now be understood from the circuits shown in Fig. 2. The connections of the anodes of the tubes in the distributor stages 13 ... 15, 16 have not been shown, but it is to be understood that the anodes of these tubes are connected to the positive pole 32 (Fig. 1) over the resistance 33.

Remembering that impulses are applied to conductor 21 every 20 milliseconds and if it be assumed that one of the tubes of the distributor has been made conducting it will be clear that on the occurrence of the next impulse the next following tube will become conducting and the tube previously conducting will be made non-conducting. In this way each tube of the distributor will be conducting for a period of 20 milliseconds. In the case of a distributor tube such as tube 16 the full potential across resistances 41 and 42 connected between cathode and ground is impressed, after an interval, between control electrode and cathode of the next tube 13.

The junction point between resistances 41 and 42 is connected to ground not only over resistance 42 but also over a rectifier 43, connected in the reverse direction, a resistance 44, and a resistance 45 to ground. The junction point between rectifier 43 and resistance 44 is connected over a resistance to the control electrode of tube 31. The reverse resistance of rectifier 43 is about 20 megohms, and resistances 44 and 45 together are about ½ megohm. The potential drop impressed between control electrode and cathode of tube 31 is therefore only a few volts, and is insufficient to cause tube 31 to become conducting even when an impulse is applied to conductor 22.

If, however, meter contacts 4 corresponding to code transmitter 12 have changed over, conditions are altered. Normally contacts 4 are in the left hand position and a tube 46 in storage device 8 is conducting, the flow of current therethrough serving to charge a condenser 47 over contacts 4. When contacts 4 change over, condenser 47 is discharged through the primary of a step-up transformer 48, and the consequent impulse of current through the secondary of the transformer impresses sufficient potential between control electrode and cathode of a tube 49 to cause that tube to become conducting. The presence of resistance 50 common to the anode connections of tubes 46 and 49 ensures that the potential of the anode of tube 46 now drops below the value required to sustain a discharge in the tube and the tube becomes non-conducting, thereby ensuring that, on the return of contacts 4 to normal position the condenser 47 will not immediately be recharged.

The current through tube 49 passes through resistances 51 and 45 to ground and also through resistance 44, rectifier 43, resistance 42 to ground, this time through the rectifier in the forward direction.

The resistance of rectifier 43 in the forward direction is about 30,000 ohms so that resistance 44 is large with respect thereto and the potential at the junction point between resistance 44 and rectifier 43, due to the current in tube 49, is only a few volts. If therefore, tube 16 were not conducting, the fact that tube 49 is conducting would be insufficient to cause tube 31 to become conducting even when an impulse occurs on conductor 22.

Now consider the case in which both tube 16 and tube 49 are conducting. Neglecting for a moment the connection through rectifier 43 and resistance 44, the junction point between resistances 41 and 42 is at the same potential (+35 volts) as the junction point between resistances 51 and 45. The connection between these two points over rectifier 43 and resistance 44 does not therefore disturb the potential gradient and the junction point between rectifier 43 and resistance 44 is also at 35 volts positive potential and this is impressed upon the control electrode of tube 31.

The effect, therefore, of both tubes 16 and 49 being conducting is to cause the control gap of tube 31 to be ionised on the arrival of the next impulse on conductor 22 which is ten milliseconds after tube 16 has become conducting. Tube 16 becomes non-conducting because tube 13 receives a potential on its control electrode over the lead from the cathode of tube 16, tube 13 conducts upon the receipt of the next impulse from source 20 over lead 21; thereupon, tube 16 extinguishes, as explained previously in connection with tubes 46 and 49. In addition to initiating the discharge of tube 13, tube 16 also serves to place a potential on the control electrode of tube 31 and the tubes of the code transmitter 12 operate in sequence to cause the transmission over line 19, Fig. 1, of the code combination for which code transmitter 12 is set, as previously explained.

When the start tube 31 has become conducting a potential is impressed on the control electrode of tube 46 and as this control electrode is also connected to the conductor 22, tube 46 becomes conducting upon the next impulse over that conductor. Tube 49 becomes non-conducting in consequence of the resistance 50 common to the anode circuits of tubes 46 and 49. The storage device 8 is thus re-set, and when contacts 4 have returned to normal position, condenser 47 is recharged.

The cathode of the last tube 52 in the code transmitter 12 is connected to the control electrode of tube 13 which is the tube in the distributor following tube 16 in the chain.

As the control electrode of tube 13 is connected to the cathode of tube 16, there are two paths in parallel for the current from the cathode of tube 52 to ground, viz. through resistance 53 to ground and through resistances 41 and 42 to ground. Thus, in order that the full potential of 35 volts shall be impressed upon the control electrode of tube 13, the connection is taken from the cathode of tube 52 instead of from the mid point of resistance 53.

This explanation will also make clear why each tube in the distributor chain is connected to the following tube in the chain in a manner which differs slightly from that in which a tube in the code transmitter 12 is connected to the next following tube therein. In the case of the latter, a point midway of the resistance between a cathode of the tube and earth is connected to the control electrode of the next tube, whereas in the case of the distributor chain, the cathode of one tube is connected directly to the control electrode of the following tube, thus giving the full potential of 35 volts to the grid of the succeeding tube in the chain.

Upon the occurrence of an impulse on conductor 21 next following tube 52 becoming conducting, tube 13 becomes conducting and tube 52 is made non-conducting. It will be noted that tube 52 remains conducting for 10 milli-seconds only, because at the expiration of that time, tube 13 will have received an igniting pulse from source 20 over lead 21, thereby extinguishing tube 52 due to the drop in potential on the anode of tube 52. If the meter contacts associated with tube 13 and its associated code transmitter have changed over, tube 13 will remain conducting for 10 milliseconds only thus completing the 20 millisecond stop period for the teleprinter code corresponding, and at the end of this period the start tube for the code transmitter associated with meter contacts 1 will become conducting and the appropriate teleprinter code is transmitted. If the meter contacts associated with tube 13 have not changed over, the regular operation of the distributor is resumed and tube 13 remains conducting for a period of 20 milliseconds.

Figure 3:
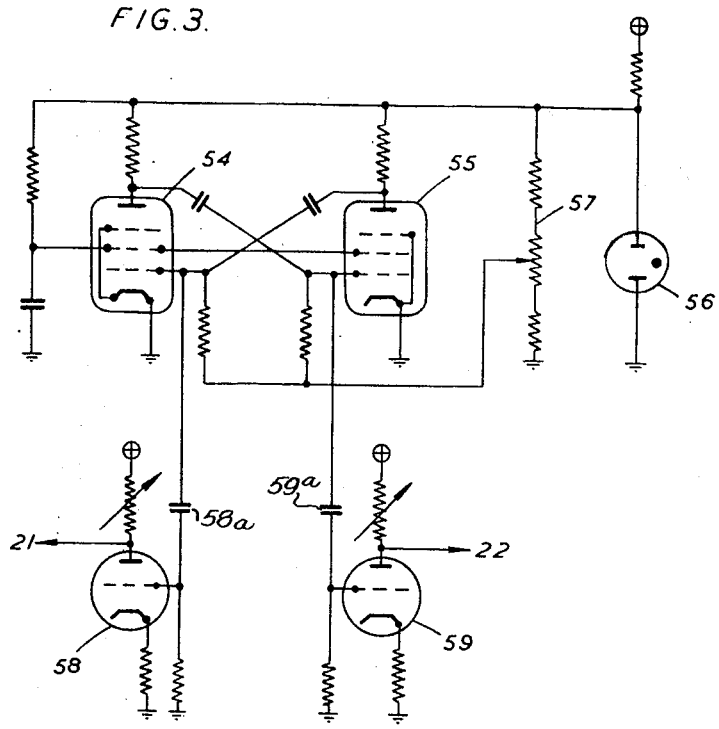
Fig. 3 shows one form of impulse source at the transmitter.

Figure 3 shows the details of the impulse source 20 of Fig. 1. This is a multivibrator consisting of two similar pentodes (high vacuum tubes) 54 and 55 connected together in well-known manner, the current supply thereto being stabilised by a gas-filled tube 56. The two control grids are connected to a point on a potentiometer 57 which point is adjustable for adjustment of the frequency of the operation of the device. The grids of the pentodes 54 and 55 are connected to the grids of high vacuum triodes 58 and 59 respectively, through respective condensers 58a and 59a, the conductors 21 and 22 being taken respectively from the anodes of these triodes. The variations of potential on the grids of the pentodes 54 and 55 are thus differentiated to produce sharp positive pulses on conductors 21 and 22.

The receiver circuit co-operating with the above described transmitter and situated at the supervisory station at which devices are to be actuated individual to the contacts 1, 2, 3 and 4 at the sending station is described in detail in our said co-pending application No. 744,010 so that a brief description only is necessary here with reference to the schematic diagram of Fig. 4.

At the supervisory station the line 19 ends in two polarised telegraph relays 60 and 61 in series normally biassed so that their contacts 62 and 63 are in marking position. The equipment at the supervisory station comprises five cold-cathode gas filled tubes 64 ... 68. Of these tube 64 is associated with a pilot train of gas filled tubes 69 for marking off the intervals of the teleprinter code. The other tubes 65 ... 68 are provided in number equal to the number of code receivers 70 ... 73 required, four being shown corresponding to the respective code transmitters 12, 11, 10 and 9. The tubes 64 ... 68 are normally conducting and the cathode of tube 64 is connected over conductor 74 to the marking contacts 63 and thus to a condenser 75 which is thus in charged condition. The code receivers have associated therewith relays 79 ... 82, respectively, which are energized when a corresponding code receiver responds to its code. Indicators 83 ... 86 are respectively associated with the said relays and are adapted to indicate upon the operation of a corresponding relay. Operation of the indicators is controlled by the relay armatures 87 ... 90, which armatures are respectively associated with relays 79 ... 82.

When relays 60 and 61 change their contacts 62 and 63 over to spacing position in response to the start element of a teleprinter code, contacts 63 cause the discharge of condenser 75 to start up an impulse source 76 capable of delivering impulses at predetermined intervals and which supplies an impulse immediately over conductor 77 and thereafter impulses at 30 millisecond intervals and supplies an impulse to conductor 78 after an interval of 10 milliseconds and thereafter impulses over that conductor at intervals of 20 milliseconds. An impulse source of the type mentioned above, is more completely described in our said last-mentioned co-pending application, and since it is not necessary for the clear understanding of the invention herein, is not further described.

Conductor 78 is connected over contacts 62 to the control electrodes of three-electrode gas filled tubes in the code receivers 70 ... 73 in accordance with the codes individual thereto. If a code individual to a particular receiver is received that receiver causes the operation of a corresponding relay 79 ... 82, which operates its contacts for a given short period of time and causes the actuation of a corresponding indicator 83 ... 86.

The pilot train 69 counts the number of elements to be received and after receipt of the last code element biases the tubes 64 ... 68 so that on the occurrence of the next impulse over conductor 77 these tubes become conducting and other tubes are caused to be non-conducting. The impulse source 76 is also brought to a standstill. The diagram of Fig. 4 shows the principle upon which the receiver acts, but in practice considerable simplification may be effected. The code receivers 70 ... 73 are trains of three-electrode gas-filled tubes and some of these tubes may be made common to more than one receiver. Thus only one tube is needed for the start element and may be made common to the four receivers, and the codes used may be chosen so that the greatest possible number of code elements is common to all the codes used. Thus the four codes used commence with a common combination of the first three code elements; mark, space, space, and tubes arranged to respond in succession to these successive elements may be common to all four receivers.

Figure 5:
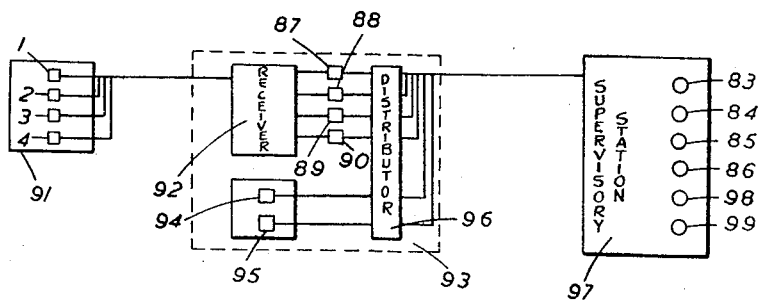
Fig. 5 shows diagrammatically one arrangement of an electric signalling system according to the invention when signalling takes place from two substations to a common supervisory station.

The invention is not limited to the circumstances that the contacts, operation of which is to be signalled to a supervisory station, are all located at one and the same sub-station. Fig. 5 shows diagrammatically how the operation of contacts situated some at one sub-station and some at another may operate corresponding indicators at the same supervisory station.

At one sub-station 91 are contacts 1, 2, 3, 4, which by means of the operations previously described transmit distinctive codes to a receiver 92 at another substation 93 and operate contacts 87, 88, 89 and 90 thereat. At substation 93 are also contacts 94 and 95 operation of which is to be indicated at a main station. There is therefore arranged at substation 93 a distributor 96 having positions corresponding to the respective contacts 87, 88, 89, 90, 94, 95 and also corresponding code transmitters (not shown) whereby operation of any one of the contacts is signalled to the supervisory station 97 and by means of the operations previously outlined individual indicators 83, 84, 85, 86, 98, 99 are selectively operated.

What is claimed is:

1. Electric signalling system comprising a plurality of contacts, a plurality of gas-filled electric discharge devices connected in a closed chain, one corresponding to each of said contacts, means for rendering the said devices conducting sequentially, means operable upon actuation of one of said contacts for registering temporarily said actuation, means operable when said actuation has been registered and when the corresponding device has become conducting to prevent the next device in the chain from becoming conducting and to cause the transmission of a signalling code individual to said contacts and means operable upon the conclusion of said transmission to cause the next device in said chain to become conducting and to effect the resumption of the action of said means for rendering the said devices conducting sequentially.

2. Electric signalling system as claimed in claim 1 in which said means for registering temporarily the actuation of said contacts comprises a three-electrode gas-filled tube and means for rendering said tube conducting upon actuation of said contacts.

3. Electric signalling system comprising a plurality of changeover contacts, a transmitter adapted to transmit a characteristic teleprinter code a storage device consisting of two three-electrode cold cathode tubes associated with each of said contacts, one of said tubes being conducting in normal position of the corresponding contacts, means operative upon changeover of said contacts to render the other of said tubes of the corresponding storage device conducting, means operative upon the last mentioned of said tubes in said storage device becoming conducting to prepare said transmitter for operation and a distributor for causing the transmission in succession of teleprinter codes corresponding to contacts that have been actuated.

4. Electric signalling system as claimed in claim 3 in which said transmitter comprises a plurality of three-electrode gas-filled tubes, one for each element of the code to be transmitted, and means for rendering said tubes conducting sequentially to time the transmission of the corresponding elements of the code.

5. Electric signalling system comprising a plurality of contacts, a corresponding plurality of pairs of three-electrode cold cathode tubes, a first tube of each pair being normally conducting, means operable upon actuation of one of said contacts to cause the second tube of the corresponding pair to become conducting and to cause the said first tube of the pair to become non-conducting, a distributor in the form of a closed chain of three-electrode cold cathode tubes (one for each of said contacts) and means for applying pulses to said distributor tubes to cause them to become conducting sequentially, a transmitting three-electrode cold cathode tube, connections between one of the tubes of said distributor and said transmitting tube and between the second tube of one of said pairs and said transmitting tube whereby when both said distributor tube and said second tube of the pair are conducting said transmitting tube may become conducting upon the occurrence of an impulse, means for supplying impulses to said transmitting tube intermediate in time to the impulses applied to said distributor connections between said transmitting tube and the tubes of said distributor whereby when one of said distributor tubes becomes conducting any other of said distributor tubes is rendered non-conducting, means operative upon said transmitting tube becoming conducting to cause the transmission of a teleprinter code corresponding to the second tube of said pair of tubes and means operative upon the conclusion of said transmission to cause another tube of said distributor to become conducting.

6. Electric signalling system as claimed in claim 5 comprising a first resistance path to earth from the cathode of a distributor tube, a second resistance path to earth from the cathode of the second tube of one of said pairs of tubes, a connection between corresponding points on said resistance paths including a rectifier and a resistance low compared with the backward resistance of said rectifier but high compared with the forward resistance of the rectifier, and a connection from the junction point between said rectifier and said resistance to the control electrode of said transmitting tube, whereby said control electrode is only raised to a potential sufficient to cause said tube to become conducting on the occurrence of said impulse when both said distributor tube and said second tube are conducting.

7. An electric impulse generator comprising a plurality of gas-filled tubes each having a pair of main electrodes and an auxiliary electrode, a source of power connected across said main electrodes, circuit means connecting certain of said tubes in a closed chain, other circuit means connecting the remaining tubes in a plurality of unclosed chains, the tubes of each of said unclosed chains being connected in cascade between a respective pair of successive tubes of said closed chain, pulse generator means adapted to apply a first train of pulses to the auxiliary electrodes of all the tubes of said closed chain simultaneously and further adapted to apply a second train of pulses to the auxiliary electrodes of all of said remaining tubes simultaneously, biasing means for said auxiliary electrodes, respectively, each of said biasing means including an impedance in series with one of the main electrodes of the tube immediately preceding, the pulses of said first train being of such magnitude and polarity as to effect ionization of a tube when a tube immediately preceding the same is energized, switch-over means for each of said unclosed chains, respectively, each of said switch-over means being arranged when actuated to modify the bias applied to all the tubes of the respective unclosed chain, the pulses of said second train being of such magnitude and polarity as to effect ionization of a tube of an unclosed chain in the actuated condition of the associated switch-over means only and upon energization of a tube immediately preceding said unclosed chain tube, said biasing means further including delay means whereby ionization of more than one tube during the occurrence of a single pulse is prevented, common load impedance means in series with said source of power, means including said delay means and said common load impedance means for extinguishing any of said tubes upon ionization of any other one of said tubes, and signaling means selectively operable by the tubes of each unclosed chain, respectively.

8. An electric impulse generator according to claim 7 wherein the pulses of said two trains are interleaved with one another.

9. An electric impulse generator according to claim 7 wherein the number of said unclosed chains corresponds to the number of tubes in said closed chain.

10. An electric impulse generator according to claim 7 wherein the number of tubes in each of said unclosed chains is the same.

11. An electric impulse generator according to claim 7 wherein said signaling means comprises a relay having two windings, said relay being adapted to transmit marking and spacing impulses according to which of said windings is energized, each tube of said unclosed chains being connected to said source of power by way of one or the other of said windings whereby successive ionization of the tubes of any unclosed chain will result in the generation of a code pattern of impulses characteristic of the particular unclosed chain.

12. An electric impulse generator according to claim 11 wherein the number of tubes in each of said unclosed chains is the same and wherein the tubes of said unclosed chains are connected to said windings so as to produce impulse combinations forming part of a start-stop teleprinter code.

ERIC MALCOLM SWIFT McWHIRTER.
ROLAND HARRIS DUNN.
PETER WILLIAM LENNOX.

REFERENCES CITED

The following references are of record in the file of this patent:

UNITED STATES PATENTS

| Number | Name | Date |
|---|---|---|
| 2,207,743 | Larson | July 16, 1940 |
| 2,207,744 | Larson | July 16, 1940 |
| 2,302,535 | Durbin | Nov. 17, 1942 |
| 2,317,995 | Krum | May 14, 1943 |
| 2,372,593 | McWhirter | Mar. 27, 1945 |
| 2,381,920 | Miller | Aug. 14, 1945 |
| 2,403,890 | Johnson | July 9, 1946 |
| 2,428,089 | Mumma | Sept. 30, 1947 |